United States Patent
Gaeta et al.

(10) Patent No.: US 11,163,725 B1
(45) Date of Patent: Nov. 2, 2021

(54) PERSONALIZED USER INTERFACE SYSTEMS AND METHODS

(71) Applicant: United Services Automobile Association (USAA), San Antonio, TX (US)

(72) Inventors: Michael Joseph Gaeta, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/085,900

(22) Filed: Oct. 30, 2020

Related U.S. Application Data

(63) Continuation of application No. 16/154,252, filed on Oct. 8, 2018, now Pat. No. 10,824,595.

(60) Provisional application No. 62/569,953, filed on Oct. 9, 2017.

(51) Int. Cl.
| | |
|---|---|
| *G06F 16/16* | (2019.01) |
| *G06F 9/451* | (2018.01) |
| *G06F 16/332* | (2019.01) |
| *G06F 16/432* | (2019.01) |
| *G06Q 40/02* | (2012.01) |

(52) U.S. Cl.
CPC ............ *G06F 16/168* (2019.01); *G06F 9/451* (2018.02); *G06F 16/3326* (2019.01); *G06F 16/434* (2019.01); *G06Q 40/02* (2013.01)

(58) Field of Classification Search
CPC ...................................................... G06F 16/168
USPC ........................................................ 715/853
See application file for complete search history.

(56) References Cited

U.S. PATENT DOCUMENTS

| | | | |
|---|---|---|---|
| 6,266,060 B1* | 7/2001 | Roth ...................... | G06F 3/0482 715/206 |
| 6,847,387 B2* | 1/2005 | Roth ...................... | G06F 3/0482 715/738 |
| 7,802,197 B2* | 9/2010 | Lew ........................ | G06F 9/451 715/789 |
| 7,984,388 B2* | 7/2011 | Dieberger ............. | G06F 3/0482 715/853 |
| 8,639,622 B1* | 1/2014 | Moore .................... | G06Q 20/00 705/43 |
| 9,898,735 B2* | 2/2018 | Girish ................. | G06Q 30/0601 |
| 10,783,576 B1* | 9/2020 | Van Os ................. | G06F 3/0482 |
| 10,824,595 B1* | 11/2020 | Gaeta ..................... | G06F 16/434 |
| 2003/0050096 A1* | 3/2003 | Heatley ................. | H04W 8/245 455/560 |
| 2005/0076308 A1* | 4/2005 | Mansell ................ | G06F 3/0482 715/811 |
| 2007/0011624 A1* | 1/2007 | Olsen ..................... | G06Q 10/10 715/811 |

(Continued)

*Primary Examiner* — Reza Nabi
(74) *Attorney, Agent, or Firm* — Fletcher Yoder, P.C.

(57) ABSTRACT

A tangible, non-transitory machine-readable medium includes machine-readable instructions that, when executed by one or more processors, cause the one or more processors to access user information, generate a cloud representation having a plurality of word clouds with varying levels of emphasis based at least in part on the user information, and output the cloud representation on a display of a computing device. The plurality of word clouds include one or more word clouds, one or more image clouds, or both.

20 Claims, 6 Drawing Sheets

(56) References Cited

U.S. PATENT DOCUMENTS

| | | | |
|---|---|---|---|
| 2007/0124234 A1* | 5/2007 | Finley | G06Q 40/025 705/38 |
| 2007/0250786 A1* | 10/2007 | Jeon | G06F 3/0482 715/765 |
| 2008/0195482 A1* | 8/2008 | Sailer | G06F 40/58 705/14.14 |
| 2009/0168607 A1* | 7/2009 | Liu | G06Q 10/109 368/10 |
| 2009/0275886 A1* | 11/2009 | Blomquist | G09G 3/3466 604/66 |
| 2009/0313544 A1* | 12/2009 | Wood | G06F 3/048 715/716 |
| 2010/0031193 A1* | 2/2010 | Stark | H04N 21/4131 715/810 |
| 2010/0070860 A1* | 3/2010 | Alkov | G06F 16/7867 715/716 |
| 2010/0159909 A1* | 6/2010 | Stifelman | H04M 1/72469 455/418 |
| 2011/0035681 A1* | 2/2011 | Mandel | H04L 51/16 715/752 |
| 2011/0252132 A1* | 10/2011 | Wetzer | G06F 9/542 709/224 |
| 2012/0005209 A1* | 1/2012 | Rinearson | G06F 16/80 707/737 |
| 2012/0084149 A1* | 4/2012 | Gaudiano | G06Q 30/0256 705/14.54 |
| 2013/0312018 A1* | 11/2013 | Elliott | H04N 21/45 725/12 |
| 2014/0229159 A1* | 8/2014 | Branton | G06F 16/345 704/9 |
| 2015/0142800 A1* | 5/2015 | Thapliyal | G06F 16/345 707/737 |
| 2016/0034887 A1* | 2/2016 | Lee | G06Q 20/321 705/39 |
| 2016/0253669 A1* | 9/2016 | Yoon | G06Q 20/327 705/75 |
| 2017/0278208 A1* | 9/2017 | Oni | G06Q 30/0601 |
| 2017/0293950 A1* | 10/2017 | Rathod | G06Q 30/0639 |
| 2017/0323276 A1* | 11/2017 | Sobolevski | G06Q 20/389 |
| 2018/0077280 A1* | 3/2018 | Palani | H04M 3/42017 |
| 2018/0295421 A1* | 10/2018 | Lim | H04N 21/4222 |
| 2020/0028753 A1* | 1/2020 | Powar | G06F 9/451 |
| 2020/0042158 A1* | 2/2020 | Skarda | G06F 3/0481 |

* cited by examiner

PERSONALIZED USER INTERFACE SYSTEMS AND METHODS

CROSS-REFERENCE TO RELATED APPLICATION

This application is a continuation of U.S. patent application Ser. No. 16/154,252, entitled "PERSONALIZED USER INTERFACE SYSTEMS AND METHODS," filed Oct. 8, 2018 which claims priority to and the benefit of U.S. Provisional Application No. 62/569,953, entitled "PERSONALIZED USER INTERFACE SYSTEMS AND METHODS," filed Oct. 9, 2017, which are hereby incorporated by reference in their entirety for all purposes.

BACKGROUND

The present disclosure relates generally to systems and methods for providing information on a user interface, and more specifically to systems and methods for providing word clouds and/or image clouds to personalize a user interface.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Modern businesses offer customers an array of online services (e.g., via the Internet), including online access to customer accounts and other information. Customers may access the online services via a wide variety of devices, such as personal computers, tablets, mobile phones. It is presently recognized that there is a need for more user-friendly user interfaces to enable customers to efficiently access online services.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a tangible, non-transitory machine-readable medium includes machine-readable instructions that, when executed by one or more processors, cause the one or more processors to access user information, generate a cloud representation having a plurality of word clouds with varying levels of emphasis based at least in part on the user information, and output the cloud representation on a display of a computing device. The plurality of word clouds include one or more word clouds, one or more image clouds, or both.

In an embodiment, a tangible, non-transitory machine-readable medium includes machine-readable instructions that, when executed by one or more processors, cause the one or more processors to access user information, receive information related to a computing device, generate a cloud representation comprising a plurality of word clouds comprising varying levels of emphasis based at least in part on the user information and the information related to the computing device, and output the cloud representation to a display of a computing device.

In an embodiment, a method includes accessing, using one or more processors, user information. The method also includes generating, using the one or more processors, a cloud representation comprising a plurality of clouds comprising varying levels of emphasis based at least in part on the user information, wherein the plurality of clouds comprises one or more word clouds, one or more image clouds, or both. The method further includes outputting, using the one or more processors, the cloud representation to a display of a computing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
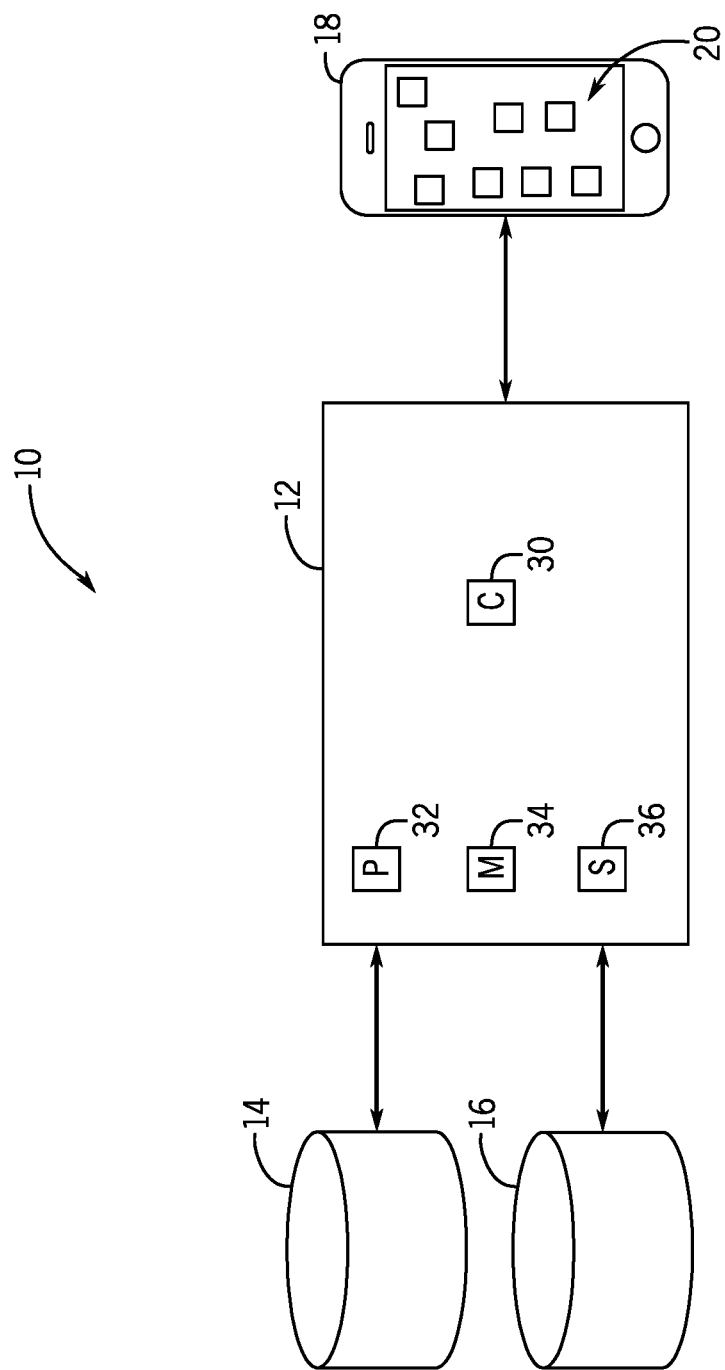
FIG. 1 is a block diagram of a system having a cloud generating system that is configured to provide a personalized cloud representation on a graphical user interface, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The information age has brought about rapid advancements in telecommunication, hardware-based computing, software, and other data related activities. Thus, the current information-based society has resulted in the generation of a vast amount of valuable digital resources with more and more data consumption by customers, vendors, and electronic devices. As personal computing devices are increasingly relied upon for access, it may be beneficial to provide efficient access to information, accounts, and services via personal computing devices, as well as a personalized user interface.

Accordingly, present embodiments are generally directed to a system that includes a cloud generating system configured to generate a cloud representation that is personalized for a customer (e.g., user). The cloud representation may include multiple clouds (e.g., word clouds and/or image clouds) that may be provided to the customer via a graphical user interface (GUI) of an electronic device or computing system (e.g., a mobile phone, tablet, wrist watch). As used herein, the term "cloud" may refer to a visual representation of text, symbols, or images. In some embodiments, the cloud generating system may be configured to receive, access, and/or analyze one or more attributes of the customer, such as one or more of the customer's prior interactions with clouds, preferences input by the customer, status of the customer's accounts, a location of a customer device (e.g., via a Global Positioning System), or the like, to generate the cloud representation. By providing clouds with various emphasis features (e.g., color, size, font, location), the customer may more easily navigate through the cloud representation and/or may more easily identify steps that need to be taken with respect to the customer's accounts, as compared to a fixed list or menu, for example. The present embodiments provide an improved, user-friendly user interface that improves the ability of the customer to use the electronic device or computing system. For example, the present embodiments include one or more particular techniques for accessing, summarizing, and/or presenting information on the user interface.

FIG. 1 is a block diagram of an embodiment of a system 10 (e.g., a personalized user interface system) that is configured to provide a personalized user interface to a customer (e.g., user). As shown, the system 10 includes a cloud generating system 12, one or more customer information databases 14, one or more cloud databases 16, and a customer computing device 18. The cloud generating system 12, in certain embodiments, may be a cloud-based computing system that includes a number of computers that may be connected through a real-time communication network, such as the Internet. In one embodiment, analysis or processing operations may be distributed over the computers that make up the cloud-based computing system. Although the cloud generating system 12 is described above as a cloud-based computing system, the cloud generating system 12 may be any suitable computing device that is capable of communicating with other devices and/or processing data in accordance with the techniques described herein.

In some embodiments, the cloud generating system 12 may be communicatively coupled to the one or more customer information databases 14 and/or the one or more cloud databases 16. The customer databases 14 may include data or information regarding a customer, such as one or more of demographics (e.g., age, gender), customer accounts, customer usage history, prior interactions with clouds, customer preferences regarding clouds, or the like.

The customer databases 14 may receive information from various sources, such as via inputs by the customer at the customer computing device 18 or via other computing devices (e.g., servers) that are used to monitor accounts or provide other services.

The one or more cloud databases 16 may include clouds (e.g., letters, words, phrases, numbers, symbols, images) that may be selected and assembled into a cloud representation 20 for presentation to the customer via a display (e.g., graphical user interface [GUI] or screen) of the customer computing device 18. In certain embodiments, the cloud database 16 may be updated in response to an input provided by the customer at the customer device 18. For example, the customer may provide an input to add words or images (e.g., photos, drawings) to the cloud database 16. In certain embodiments, the cloud generating system 12 may receive, access, and/or analyze information from the databases 14, 16, as well as information related to the customer computing device 18 (e.g., a type of customer computing device 18, characteristics of the display, software), to generate the cloud representation 20.

In operation, the cloud generating system 12 is configured to generate a personalized cloud representation 20 having multiple clouds (e.g., word clouds and/or image clouds) that are displayed on the display of the customer computing device 18. As shown, the multiple clouds are positioned at different vertical and/or horizontal locations on the display and are not presented as a simple list (e.g., single column, single row, table of separate columns and rows). However, it should be appreciated that the multiple clouds may be presented in a simple list, or in any variable and/or arbitrary arrangements. In some embodiments, the cloud representation 20 may be a menu (e.g., navigable menu), such that each cloud may be selected to navigate to another screen (e.g., touched or tapped by the customer via a touch screen). The multiple clouds may include multiple word clouds having letters, words, phrases, and/or numbers of different colors, sizes, fonts, or the like to provide varying levels of emphasis to the word clouds. In some embodiments, the multiple clouds may additionally or alternatively include image clouds having images of different colors, sizes, or the like to provide varying levels of emphasis to the image clouds. For example, if the customer has an overdue bill on an account, a word cloud for the account may be emphasized (e.g., may be larger than other word clouds, may be a more vibrant color [e.g., red] than other word clouds, may be presented in a central or preferred location, and/or have a bold font). For example, if the customer has selected a word cloud for an investment account on multiple previous occasions, the word cloud for the investment account may be emphasized.

Upon selection of a particular word cloud, the customer may be directed to a screen with additional relevant information (e.g., account information) or a screen that includes a sub-menu in the form of another cloud representation 20. The cloud representation 20 may be generated and/or updated by the cloud generating system 12 continuously, periodically (e.g., at regular intervals, such as hourly, daily, or weekly), in response to a most recent selection of a particular word cloud, in response to a change in status of the customer's accounts, in response to a customer logging into their account via the customer computing device 18 (e.g., each time the customer logs into their account), in response to a customer providing an input to provide a menu or a cloud menu at the customer computing device 18, in response to a customer providing an input to update the cloud representation 20 at the customer computing device 18, and/or in response to a customer providing an input of preferences at the customer computing device 18, for example.

In some embodiments, the customer may be presented with the cloud representation 20 upon accessing and/or logging into their account using the customer computing device 18. The customer may select a first cloud of the cloud representation 20 (and then clouds in any subsequent cloud representations provided as sub-menus) to carry out a task, such as reviewing information related to their account, paying a bill, or the like. The customer may then return to the cloud representation 20; however, the cloud representation 20 may be updated to include different clouds and/or different levels of emphasis for the clouds. For example, in the updated cloud representation 20, the first cloud selected by the customer may remain emphasized or may be provided with an increased level of emphasis because the customer recently selected the first cloud. Alternatively, in the updated cloud representation 20, the first cloud selected by the customer may not be emphasized or may be provided with a decreased level of emphasis because the customer already selected the first cloud and/or addressed any outstanding task associated with the first cloud (e.g., paid an overdue bill). While the illustrated customer computing device 18 is a mobile phone, it should be appreciated that the system 10 may be utilized to provide the cloud representation 20 on any type of display, which may be associated with any type of electronic or computing device, including a laptop, tablet, computer, wrist watch, or the like.

The cloud generating system 12 may include certain components to facilitate these actions. As shown, the cloud generating system 12 may include a communication component 30, a processor 32, a memory 34, and a storage 36, or any of a variety of other components that enable the cloud generating system 12 to carry out the techniques described herein. The communication component 30 may be a wireless or wired communication component that may facilitate communication with the customer computing device 18, the databases 14, 16, and other devices or systems.

The processor 32 may be any suitable type of computer processor or microprocessor capable of executing computer-executable code. The processor 32 may also include multiple processors that may perform the operations described herein. The memory 34 and the storage 36 may be any suitable articles of manufacture that can serve as media to store processor-executable code, data, or the like. These articles of manufacture may represent computer-readable media (e.g., any suitable form of memory or storage) that may store the processor-executable code used by the processor 32 to perform the presently disclosed techniques. The memory 34 and the storage 36 may also be used to store the data, various other software applications, and the like. The memory 34 and the storage 36 may represent non-transitory computer-readable media (e.g., any suitable form of memory or storage) that may store the processor-executable code used by the processor 32 to perform various techniques described herein. It should be noted that non-transitory merely indicates that the media is tangible and not a signal.

It should be noted that the components described above with regard to the cloud generating system 12 are exemplary components and the cloud generating system 12 may include additional or fewer components as shown. Additionally, it should be noted that the customer computing device 18 may also include similar components as described as part of the cloud generating system 12 (e.g., respective communication devices, processors, memories, storage), as well as a display, to facilitate the disclosed operation of the system 10.

Figure 2:
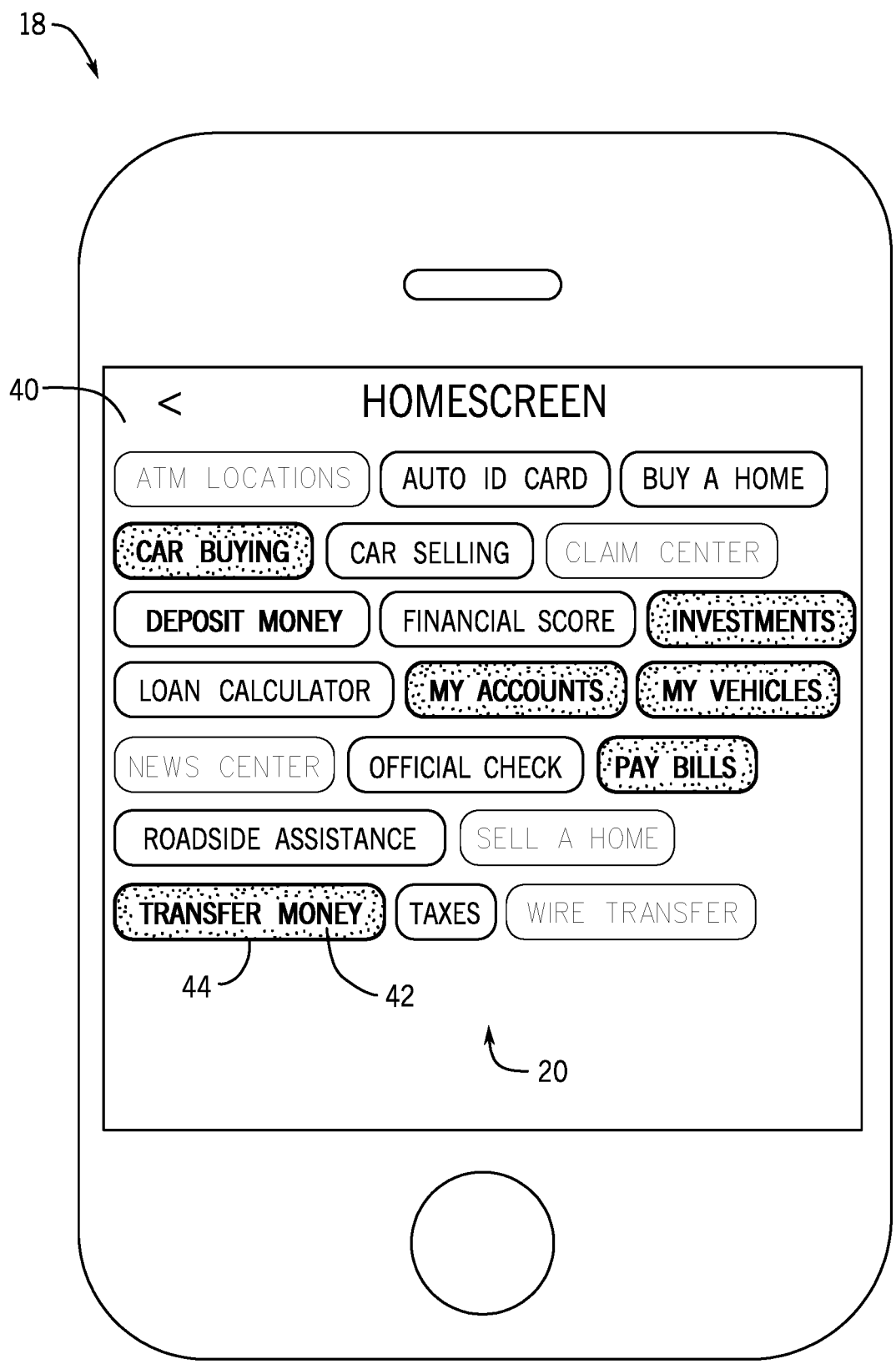
FIG. 2 illustrates an example of the cloud representation that may be generated by the cloud generating system of FIG. 1, in accordance with an embodiment of the present disclosure.

FIG. 2 illustrates an example of the cloud representation 20 that may be generated by the cloud generating system 12, in accordance with an embodiment of the present disclosure. As shown, the cloud representation 20 is displayed on a display 40 (e.g., screen) of the customer computing device 18. As discussed above, multiple word clouds 42 may be presented on the display 40 with varying emphasis and/or in varying arrangements, which may be determined based at least in part on information about the customer, which may be accessed from the database 16, for example. As used herein, the term "word cloud" may refer to a visual representation of text, which may include letters, words, phrases, and/or numbers. In some embodiments, the cloud generating system 12 may access and/or analyze information related to one or more of the customer's prior interactions with clouds (e.g., time since last selection, frequency of selection), preferences input by the customer (e.g., customer's preferences related to arrangement or location on the display 40, cloud style, cloud size, font size, and/or colors; customer's ranking of clouds, accounts, or services), status of the customer's accounts or service (e.g., overdue accounts, bills due, low balance, renewal due), or the like. Additionally or alternatively, certain characteristics (e.g., cloud size, number of clouds) and/or the arrangement of the word clouds 42 may be determined and/or adjusted based on information about the customer computing device 18, such as a type of display 40 and/or characteristics of the display 40 (e.g., a size, shape, resolution, and/or brightness of the display 40).

In the illustrated embodiment, each of the word clouds 42 include a boundary or outline 44 (e.g., shaded block, which may have different colors and/or levels of line thickness for different levels of emphasis). The word clouds 42 may also have different levels of emphasis provided by other features, such as different sizes, different colors, different shading, and/or different fonts. For example, multiple different colors within the outline 44, multiple different levels of shading within the outline 44, multiple different colors of the text, multiple different levels of boldness of the text, and/or multiple different levels of font size of the text may be used to provide the different levels of emphasis (e.g., multiple may refer to 2, 3, 4, 5, 6, 7, 8, 9, 10, or more). As shown, the word clouds 42 are arranged in rows and are in alphabetical order from the top left corner to the bottom right corner of the cloud representation 20, although any of a variety of arrangements are envisioned. Furthermore, in some embodiments, the arrangement may be modified by the customer based on the customer's preferences. As noted above, the word clouds 42 may form a menu, and the customer may select (e.g., tap or click on) the word clouds 42 to navigate through the menu to access information. By storing, retrieving, and analyzing data in the databases 14, 16 in this manner, the system 10 may efficiently create a personalized menu that is easy to navigate and/or indicates additional information to the customer (e.g., the emphasis indicates information about prior interactions, preferences, and/or accounts that need attention), thereby improving operation of the system 10 and its computing devices (i.e., the cloud generating system 12, the customer computing device 18). Furthermore, the cloud representation 20 may be utilized to drive customer behavior, such as by emphasizing a particular word cloud to encourage the customer to select the particular word cloud. In this manner, the cloud generating system 12 may encourage the customer to review an account that needs attention and that can be accessed by selecting the particular word cloud, for example.

Figure 3:
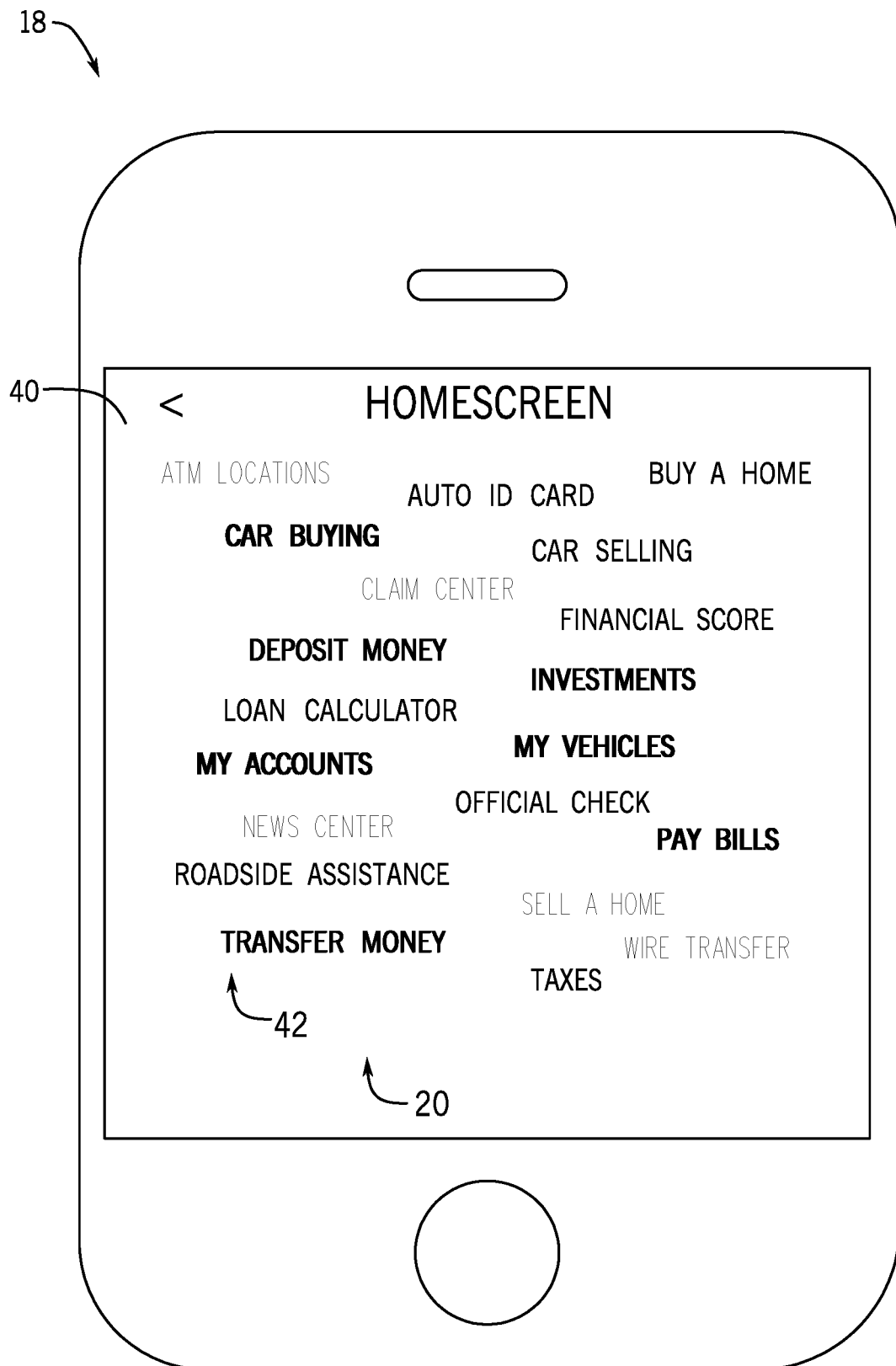
FIG. 3 illustrates another example of the cloud representation that may be generated by the cloud generating system of FIG. 1, in accordance with an embodiment of the present disclosure.
Figure 4:
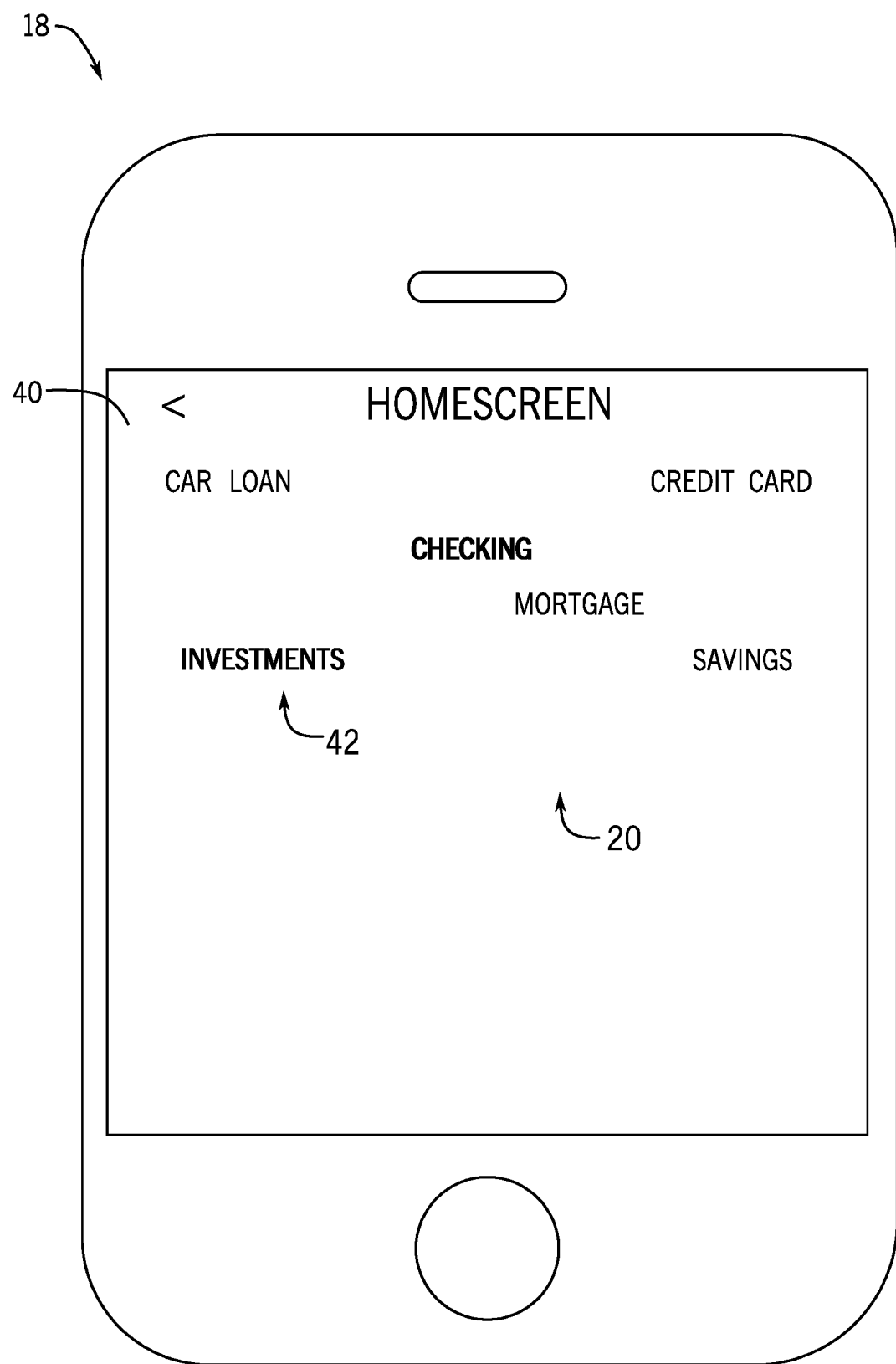
FIG. 4 illustrates an example of the cloud representation that may be generated by the cloud generating system of FIG. 1 in response to selection of a word cloud in the cloud representation of FIG. 3, in accordance with an embodiment of the present disclosure.

FIG. 3 illustrates another example of the cloud representation 20 that may be generated by the cloud generating system 12, in accordance with an embodiment of the present disclosure. In the illustrated embodiment, the word clouds 42 do not include a boundary or outline, but include text having different levels of emphasis provided by different sizes, different colors, and/or different fonts. As noted above, the word clouds 42 may form a menu, and the customer may select (e.g., tap or click on) the word clouds 42 to navigate through the menu to access information. Accordingly, FIG. 4 illustrates an example of word clouds 42 that may be generated by the cloud generating system 12 in response to selection of one of the word clouds 42 of FIG. 3. For example, FIG. 4 is a sub-menu of word clouds 42 that may be provided on the display 40 in response to selection of the "My Accounts" word cloud 42 shown in FIG. 3. Thus, the customer may efficiently navigate through menus and sub-menus of word clouds 42 to access desired information.

As noted above, the word clouds 42, as well as the arrangement of the word clouds 42, may be selected and/or determined based at least in part on information about the customer. Accordingly, the sub-menu of word clouds 42 shown in FIG. 4 may be provided in accordance with the customer's inputs regarding preferences for word clouds 42 to display in response to selection of the "My Accounts" word cloud 42 in the menu of FIG. 3. For example, the customer may provide an input indicating that the customer would prefer for the car loan, credit card, checking, savings, mortgage, and investment account word clouds 42 to be displayed upon selection of the "My Accounts" word cloud 42 in the menu of FIG. 3. Thus, in some such embodiments, the cloud generating system 12 may provide these word clouds 42 in the sub-menu of FIG. 4, and the cloud generating system 12 may adjust the emphasis of each of the word clouds 42 in the sub-menu of FIG. 4 based on one or more other factors, such as the customer's prior interactions with the word clouds 42, preferences related to emphasis input by the customer, status of the customer's accounts, characteristics of the customer computing device 18, or the like. Different word clouds 42 may be emphasized for the same or different reasons (e.g., based on the same or different factors). For example, the "Checking" word cloud 42 and the "Investments" word cloud 42 may be emphasized (e.g., via bold font) based on receipt of information indicating that the customer has frequently (e.g., most frequently or more than a threshold number of times) interacted with these word clouds 42 over a period of time. As another example, the "Checking" word cloud 42 may be emphasized based on receipt of information indicating that the balance in the customer's checking account is low (e.g., below a threshold) and also that the customer frequently selects the "Checking" word cloud 42, while the "Investments" word cloud 42 may be emphasized based on receipt of information indicating that the customer prefers for the "Investments" word cloud 42 to always be emphasized to encourage regular investing. Additionally or alternatively, different word clouds 42 may receive the same or different types and/or degrees of emphasis. For example, the "Checking" word cloud 42 may be emphasized via bold font and one color, while the "Investments" word cloud 42 may only be emphasized via bold font. In this way, the cloud representation 20 can provide varying levels of emphasis, which may assist the customer to efficiently identify and select word clouds 42 of interest. The type and/or degree of emphasis may be based on and/or indicative of the predicted relevance of the word cloud 42 to the customer (e.g., which word cloud 42 is expected to be selected by the customer and/or which word cloud 42 the customer should select) as determined by the cloud generating system 12.

Figure 5:
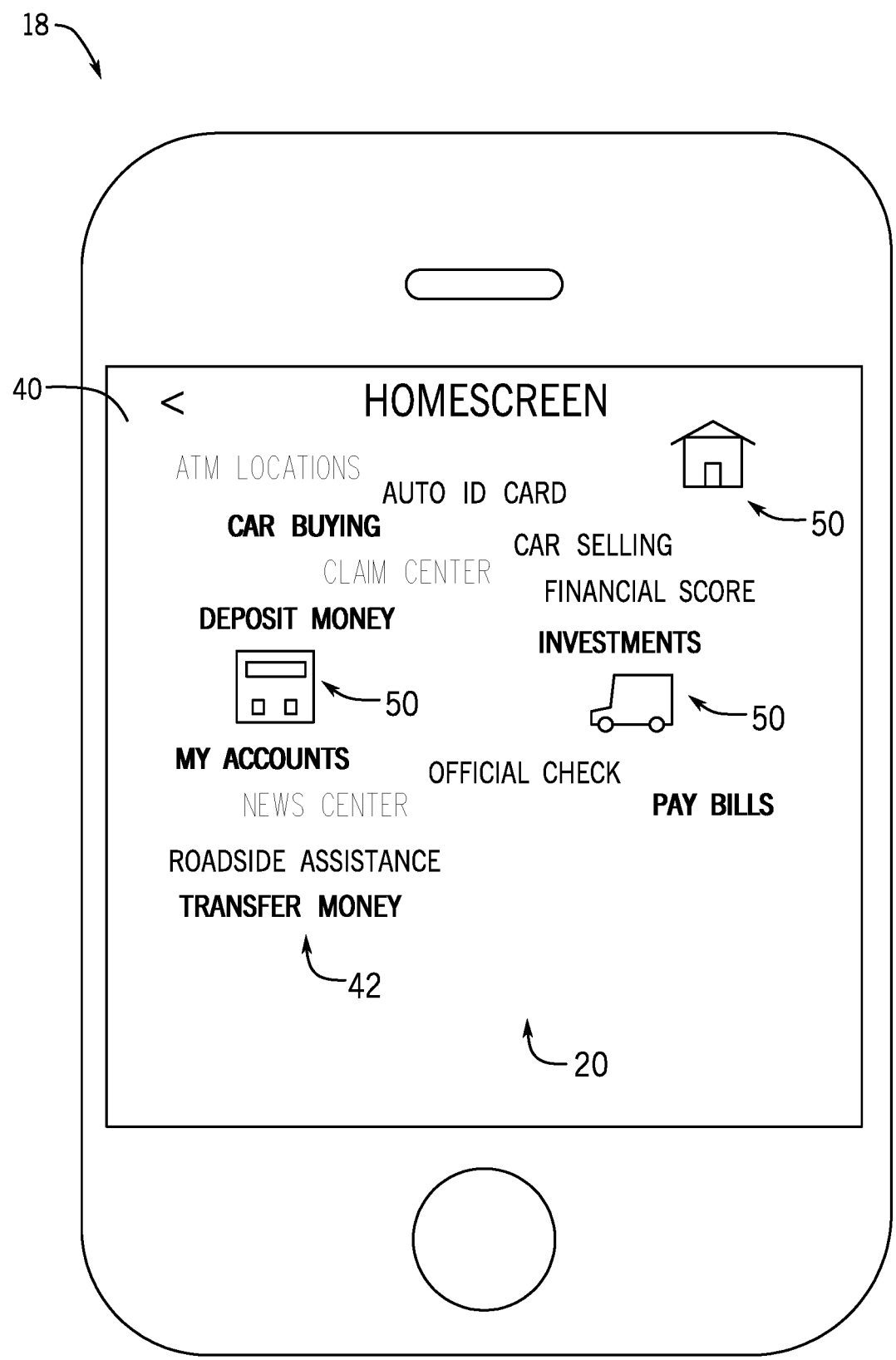
FIG. 5 illustrates an example of image clouds and word clouds of the cloud representation that may be generated by the cloud generating system of FIG. 1, in accordance with an embodiment of the present disclosure.

FIG. 5 illustrates an example of image clouds 50 and word clouds 42 that may be provided in the cloud representation 20 that is generated by the cloud generating system 12, in accordance with an embodiment of the present disclosure. As used herein, the term "image cloud" may refer to a visual representation of symbols or images (e.g., photos, drawings). It should be appreciated that the cloud generating system 12 may be configured to provide only image clouds 50, only word clouds 42, or a combination of both on the display 40 of the customer computing device 18. In some embodiments, the cloud generating system 12 may present the image clouds 50 and/or the word clouds 42 with varying emphasis and/or in varying arrangements, which may be determined based at least in part on the information about the customer, which may be accessed from the database 16, for example. It should be appreciated that the image clouds may include varying emphasis in the manner discussed above with respect to FIGS. 1-5. For example, the image clouds may have varying sizes, boundaries around the image, colors, and/or locations on the display 40 based on one or more factors.

In some embodiments, the customer may provide an input indicating the customer's preference for use of image clouds 50, such as whether to use image clouds 50 and/or which images to use for certain accounts or services. For example, the customer may provide an input indicating a preference for an image of a house to represent a link to the customer's mortgage account, a preference for an image of a calculator to represent a link to a loan calculator application, a preference for an image of a vehicle to represent a link to information about the customer's vehicles, and so forth. Thereafter, the cloud generating system 12 may generate the cloud representation 20 having particular image clouds 50 and/or word clouds 42 based at least in part on the customer's preferences. In some embodiments, the customer may take photos, access images, or draw images, and submit such photos or images via the customer computing device 18 for inclusion in the database 14 and for subsequent presentation in the cloud representation 20.

Figure 6:
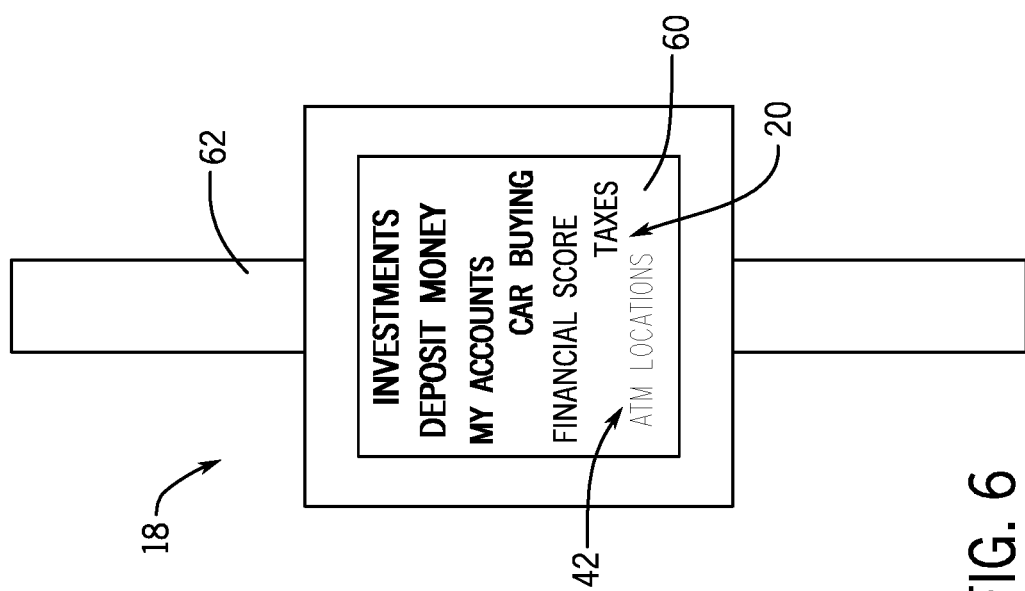
FIG. 6 illustrates an example of the cloud representation that may be generated by the cloud generating system of FIG. 1 and provided on another type of graphical user interface, in accordance with an embodiment of the present disclosure.

FIG. 6 illustrates an example of the cloud representation 20 that may be generated by the cloud generating system 12 and provided on another type of display, such as a relatively small display 60 of a wrist watch 62 or other wearable device. In the illustrated embodiment, the word clouds 42 include text having different levels of emphasis provided by different colors, different sizes, different fonts, and/or different locations on the display 60. For example, the "Investments" word cloud 42 is emphasized via a dark color, a bold font, a large size, and a location at a top center portion of the display 60. While FIGS. 2-5 illustrate the word clouds 42 arranged in alphabetical order, FIG. 6 illustrates one example of the word clouds 42 in another arrangement. For example, in FIG. 6, the word clouds 42 are arranged with emphasized word clouds 42 in one portion of the display 60 (e.g., a top portion) and less emphasized word clouds 42 in another portion of the display 60 (e.g., a bottom portion). It should be appreciated that the word clouds 42 may be arranged in any of a variety of manners. As discussed above, the cloud generating system 12 may determine which word clouds 42 to present, the emphasis to be provided for each word cloud 42, and/or the arrangement of the word clouds 42 based at least in part on information about the customer and/or information about the type of customer computing device 18 to generate the personalized cloud representation 20.

Figure 7:
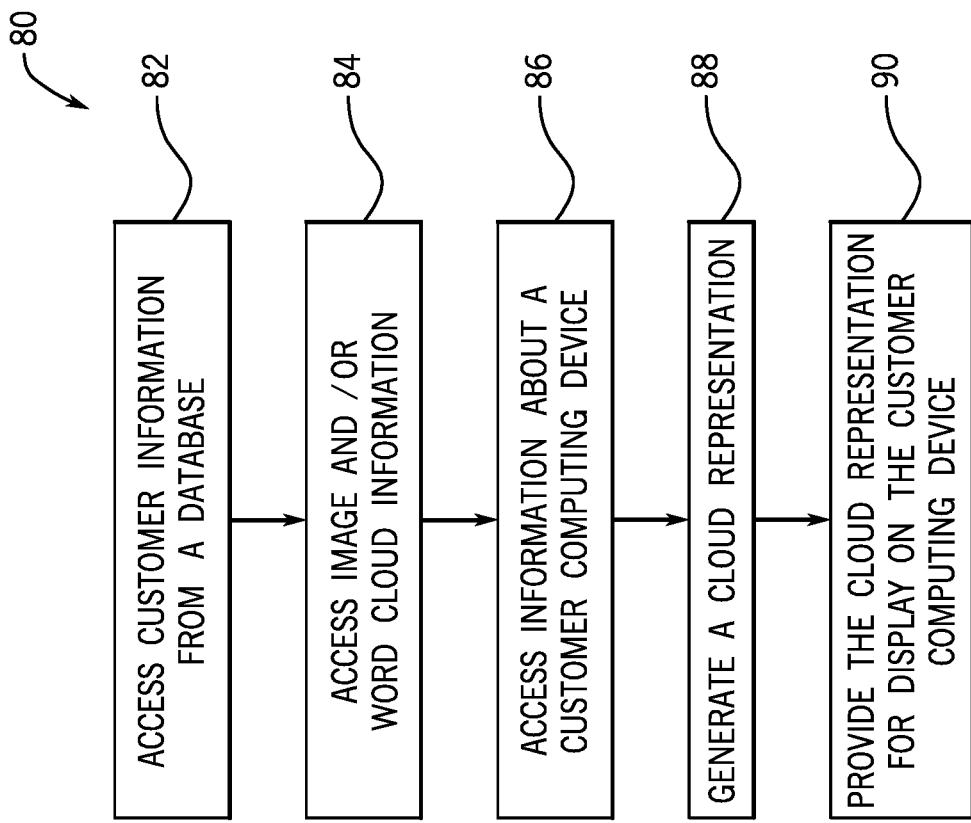
FIG. 7 illustrates a flowchart of a process for providing the cloud representation on the graphical user interface using the system of FIG. 1, in accordance with an embodiment of the present disclosure.

FIG. 7 is a process flow diagram illustrating a method 80 for providing word clouds 42 on the customer computing device 18 using the system 10, in accordance with aspects of the present disclosure. The method 80 includes various steps represented by blocks. It should be noted that the method 80 may be performed as an automated procedure by a system, such as the system 10. Although the flow chart illustrates the steps in a certain sequence, it should be understood that the steps may be performed in any suitable order and certain steps may be carried out simultaneously, where appropriate. Further, certain steps or portions of the method 80 may be omitted and other steps may be added. While certain steps of the method 80 are discussed with respect to the cloud generating system 12, it should be understood that the steps or portions of the methods may be performed by any suitable processing device and/or by separate devices. For example, a first portion of the method may be performed by the one or more processors 32 of the cloud generating system 12, while a second portion of the method may be performed by a processor of the customer computing device 18.

In block 82, the cloud generating system 12 may access customer information from the database 16. In some embodiments, the cloud generating system 12 may access information related to one or more of the customer's prior interactions with clouds (e.g., time since last selection, frequency of selection), preferences input by the customer (e.g., customer's preferences related to arrangement, cloud style, cloud size, font size, and/or colors; customer's ranking of clouds, accounts, or services), status of the customer's accounts or service (e.g., overdue accounts, bills due, low balance, renewal due), or the like. As noted above, the customer information in the database 16 may be updated over time, such as based on inputs indicative of the customer's prior interactions with the clouds, inputs indicative of the status of the customer's accounts or services, and/or inputs indicative of the customer's preferences.

In block 84, the cloud generating system 12 may access image and/or word cloud information from the database 14. In some embodiments, images for the image clouds 50 and/or text for the word clouds 42 may be stored in the database 14. As noted above, the information in the database 14 may be updated over time, such as based on inputs of new images and/or new text. In block 86, the cloud generating system 12 may access information about the customer computing device 18 on which the cloud representation 20 will be displayed. Such information may include one or more of a type of customer computing device 18, characteristics (e.g., size, shape, resolution, brightness) of the display of the customer computing device 18, software of the customer computing device 18, or the like.

In block 88, the cloud generating system 12 may generate the cloud representation 20 based at least in part on the customer information, the image and/or word cloud information, and/or the information about the customer computing device 18. For example, the cloud generating system 12 may analyze the various inputs and information received (in blocks 82, 84, and 86) to select appropriate image and/or word clouds for the cloud representation, predict a relevance of each of the appropriate image and/or word clouds, and select an appropriate type and/or degree of emphasis for each of the appropriate image and/or word clouds based on the predicted relevance. In block 90, the cloud generating system 12 may provide the cloud representation 20 and/or instruct the customer computing system 18 to display the cloud representation 20 on the display for visualization by the customer. As noted above, the cloud representation 20 may include image clouds 50 and/or word clouds 42 with varying levels of emphasis provided by one or more of different colors, sizes, fonts, location, or the like.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A tangible, non-transitory machine-readable medium comprising machine-readable instructions that, when executed by one or more processors, cause the one or more processors to:
   access a status of each of a plurality of accounts of a user;
   generate a cloud representation comprising a plurality of clouds for display on a computing device, wherein the plurality of clouds comprises one or more word clouds, one or more image clouds, or both, and wherein a cloud of the plurality of clouds is associated with an account of the plurality of accounts of the user;
   set a level of emphasis for the cloud of the plurality of clouds in response to identifying an outstanding task for the account of the plurality of accounts of the user, wherein the level of emphasis correlates to a presentation characteristic of the cloud; and
   decrease the level of emphasis for the cloud of the plurality of clouds in response to selection of the cloud of the plurality of clouds and completion of the outstanding task for the account of the plurality of accounts of the user.

2. The tangible, non-transitory machine-readable medium of claim 1, wherein the machine-readable instructions, when executed by the one or more processors, cause the one or more processors to access user preferences and to generate the cloud representation based on the user preferences.

3. The tangible, non-transitory machine-readable medium of claim 2, wherein the machine-readable instructions, when executed by the one or more processors, cause the one or more processors to access data indicative of prior interactions between the user and the plurality of clouds and to generate the cloud representation based on the prior interactions between the user and the plurality of clouds.

4. The tangible, non-transitory machine-readable medium of claim 3, wherein the machine-readable instructions, when executed by the one or more processors, cause the one or more processors to determine a respective predicted relevance for each cloud of the plurality of clouds based on the user preferences, the prior interactions, or both.

5. The tangible, non-transitory machine-readable medium of claim 1, wherein the machine-readable instructions, when executed by the one or more processors, cause the one or more processors to adjust the cloud representation in response to receipt of user input to add a word, an image, or both to at least one cloud of the plurality of clouds.

6. The tangible, non-transitory machine-readable medium of claim 1, wherein the presentation characteristic includes a letter size, an image size, a type of font, a color, a location on an electronic display of the computing device, or any combination thereof.

7. The tangible, non-transitory machine-readable medium of claim 1, wherein:
   the cloud of the plurality of clouds is a first cloud of the plurality of clouds,
   the account of the plurality of accounts of the user is a first account of the plurality of accounts of the user,
   a second cloud of the plurality of clouds is associated with a second account of the plurality of accounts of the user, and the machine-readable instructions, when executed by the one or more processors, cause the one or more processors to set a respective level of emphasis for the second cloud of the plurality of clouds that is lower than the level of emphasis for the first cloud of the plurality of clouds in response to identifying no respective outstanding task for the second account of the plurality of accounts of the user.

8. The tangible, non-transitory machine-readable medium of claim 7, wherein the machine-readable instructions, when executed by the one or more processors, cause the one or more processors to increase the respective level of emphasis for the second cloud of the plurality of clouds in response to identifying a respective outstanding task for the second account of the plurality of accounts of the user.

9. The tangible, non-transitory machine-readable medium of claim 1, wherein the account of the plurality of accounts of the user comprises a bank account of the user.

10. The tangible, non-transitory machine-readable medium of claim 1, wherein the outstanding task comprises a bill due for the account of the plurality of accounts of the user.

11. The tangible, non-transitory machine-readable medium of claim 1, wherein the account of the plurality of accounts of the user is accessible via the selection of the cloud of the plurality of clouds to thereby enable the user to complete the outstanding task via a graphical user interface.

12. The tangible, non-transitory machine-readable medium of claim 1, wherein the machine-readable instructions, when executed by the one or more processors, cause the one or more processors to decrease the level of emphasis for the cloud of the plurality of clouds in response to the completion of the outstanding task for the account without the selection of the cloud.

13. A system, comprising:
a processor; and
a memory accessible by the processor and storing instructions that, when executed by the processor, cause the processor to perform operations comprising:
accessing information related to each of a plurality of accounts of a user;
generating a cloud representation comprising a plurality of clouds for display on a computing device, wherein the plurality of clouds comprises one or more words clouds, one or more image clouds, or both, and wherein a cloud of the plurality of clouds is associated with an account of the plurality of accounts of the user;
setting a high level of emphasis for the cloud of the plurality of clouds in response to identifying an outstanding task for the account of the plurality of accounts of the user, wherein the level of emphasis correlates to a presentation characteristic of the cloud; and
decreasing the high level of emphasis for the cloud of the plurality of clouds to a low level of emphasis for the cloud of the plurality of clouds in response to selection of the cloud of the plurality of clouds.

14. The system of claim 13, wherein the operations comprise outputting the cloud representation to an electronic display of the computing device.

15. The system of claim 14, wherein the operations comprise generating the cloud representation based on information related to the computing device.

16. The system of claim 13, wherein the outstanding task comprises a bill due, a low balance, a renewal due, or any combination thereof.

17. The system of claim 13, wherein the operations comprise decreasing the high level of emphasis for the cloud of the plurality of clouds to the low level of emphasis for the cloud of the plurality of clouds in response to completion of the outstanding task for the account of the plurality of accounts of the user without the selection of the cloud of the plurality of clouds.

18. A method, comprising:
accessing, using one or more processors, information related to each of a plurality of accounts of a user;
generating, using the one or more processors, a cloud representation comprising a plurality of clouds for display on a computing device, wherein the plurality of clouds comprises one or more words clouds, one or more image clouds, or both, and wherein a cloud of the plurality of clouds is associated with an account of the plurality of accounts of the user;
setting, using the one or more processors, a level of emphasis for the cloud of the plurality of clouds in response to the information related to the plurality of accounts of the user indicating an outstanding task for the account of the plurality of accounts of the user, wherein the level of emphasis correlates to a presentation characteristic of the cloud; and
decreasing, using the one or more processors, the level of emphasis for the cloud of the plurality of clouds in response to selection of the cloud of the plurality of clouds.

19. The method of claim 18, comprising providing access to respective information related to the account of the plurality of accounts via the selection of the cloud of the plurality of clouds.

20. The method of claim 18, comprising decreasing the level of emphasis for the cloud of the plurality of clouds in response to completion of the outstanding task for the account of the plurality of accounts of the user.

* * * * *